Aug. 7, 1928.
O. U. ZERK
1,679,888
LUBRICATING APPARATUS
Filed April 11, 1924
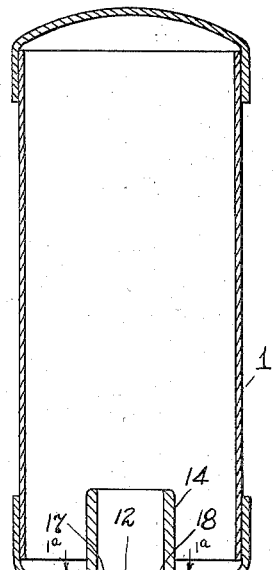
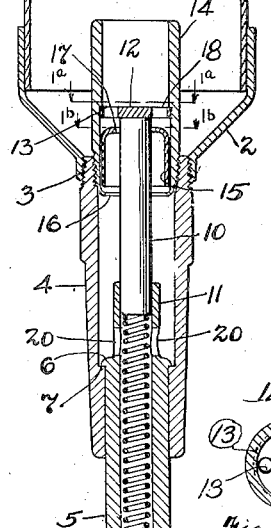
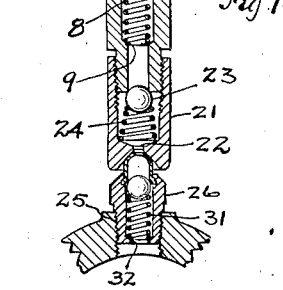
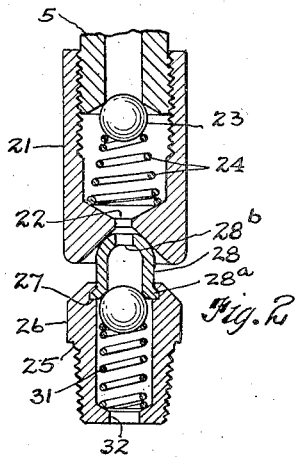
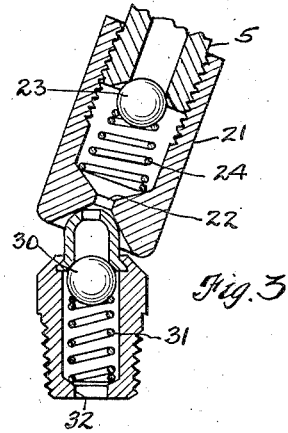
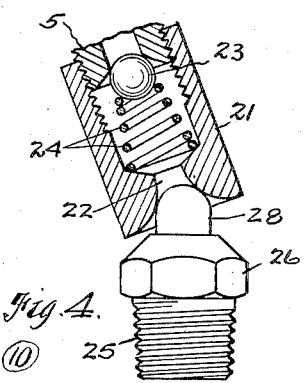
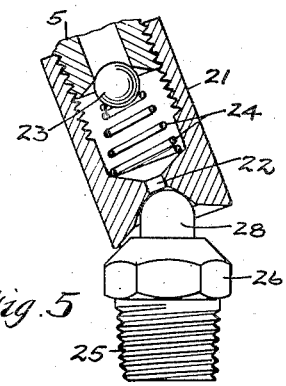
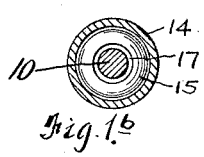
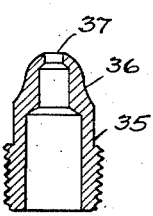
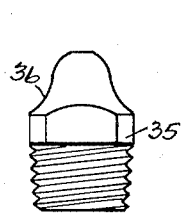
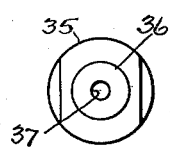
INVENTOR.
Oscar U. Zerk
BY Earl X Pierce
ATTORNEY Patented Aug. 7, 1928.

1,679,888

UNITED STATES PATENT OFFICE.

OSCAR U. ZERK, OF CLEVELAND, OHIO, ASSIGNOR TO BASSICK MANUFACTURING COMPANY, OF CHICAGO, ILLINOIS, A CORPORATION OF DELAWARE.

LUBRICATING APPARATUS.

Application filed April 11, 1924. Serial No. 705,815.

The present improvements, relating, as indicated, to lubricating apparatus, have more particular regard to advices designed for use in lubricating systems such as are generally employed in connection with automobiles and the like, wherein the bearings requiring lubrication are fitted with suitable connections or nipples and the lubricant is supplied to these under pressure from a portable container. In systems of this type, the preferred arrangement is one in which automatic sealing contact with the nipple is obtained by pressing the nozzle of the lubricant discharging device against the nipple, particularly where the forcible discharge of the lubricant is effected incidentally to pressing the nozzle against the nipple.

The primary object of the present invention is to provide an improved design and construction of co-operating nipple and nozzle for use in the relation stated above, or other similar uses, whereby automatic sealing contact may be obtained between the parts in question by forcibly pressing the nozzle against the nipple. In order satisfactorily to use a lubricating device of the type described, it is not only essential that a close fitting contact be secured between the nozzle opening and the nipple in some one relative position thereof, but such sealing contact must be obtainable irrespective of whether the axis of the nozzle coincides with the axis of the nipple, for, due to accident or cramped surroundings, the nozzle may be applied in an angular relation to the nipple. Furthermore, the nipple is apt to collect more or less dust and grit and the sealing contact must be effected despite this. It is desirable, finally, that the employment of sharp edges in connection with either contact face be avoided for the reason that, unless specially hardened, and even if specially hardened, such an edge is very apt to become abraded or worn in use or to be accidentally damaged by contact with tools or foreign bodies. This is particularly true in the case of an automobile where any projecting part, even one that projects as slightly as a nipple on a bearing, is liable to be struck by flying stones or come more or less forcibly into collision with various objects.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of the various mechanical forms in which the principle of the invention may be used.

In said annexed drawing:—

Fig. 1 is a central longitudinal section of one form of my improved nipple and co-operating nozzle, the latter being shown in conjunction with a lubricant discharging device of the type hereinbefore referred to; Figs. 1$^a$ and 1$^b$ are transverse sections of details of such lubricant discharging device, the planes of the sections being indicated on Fig. 1 by the lines $a$—$a$ and $b$—$b$, respectively; Fig. 2 is a view similar to that of Fig. 1, but on a larger scale, the nozzle only of such discharge device being shown; Fig. 3 is a view similar to Fig. 2, but showing the parts in different angular relation to each other; Figs. 4 and 5 are side elevational views of my improved nipple, showing nozzles of slightly different forms in sealing contact therewith; and Fig. 6 is a central section, Fig. 7 a side elevation, and Fig. 8 a plan view of a modified construction of my improved nipple.

The lubricant discharging device, illustrated in Fig. 1, may be regarded merely as typical, so far as the present case is concerned such novel features of construction as are embodied therein being reserved for a separate application. Essentially the device comprises a sealed container 1, preferably of general cylindrical form and having its head or cap 2 formed with an internally threaded bore 3 for the reception of the lubricant discharging device proper. The several parts composing such last mentioned device are carried in or by a tubular shell 4 that is threaded in cap piece 2 so as to form in effect an extension of the container body 1. Reciprocable within said shell 4 is a tubular member 5 that constitutes in effect a tubular piston, said member being formed at its inner end with a flange 6 that is normally pressed against an internal shoulder 7 in the shell 4 by means of a spring 8.

Said spring is contained within the tubular piston, abutting at its forward end against an internal shoulder 9 in said piston, while the inner end of said spring similarly abuts against the forward end of a solid plunger 10 that in the normal extended position of the piston projects a short distance within an extension 11 of such piston that extends inwardly beyond the flange 6. Movement of the plunger 10 inwardly, i. e., in the direction of container 1, is restrained by the engagement of a spider-like head 12 thereon with an internal shoulder 13 in a hollow retaining member 14 that has threaded engagement with the upper end of shell 4 so as to form in effect an inwardly projecting continuation thereof. The inner end of spring 8 pressing, as above described, against the forward end of plunger 10 serves at all times to retain the head 12 against the shoulder 13 so that the plunger is, in effect, fixedly mounted in member 14 although made separately therefrom.

Reciprocably held in the outer portion of tubular member 14, i. e. the portion that surrounds the inner end of the plunger 10, is a cup-shaped piston 15, the movement of the piston being limited by means of an inturned flange 16 on the lower end of said member 14. The open end of piston 15 is directed outwardly, i. e. towards the chamber in the shell 4, and the head of said piston does not fit tightly around the plunger 10, but the diameter of the opening 17 in such head sufficiently exceeds the diameter of the plunger so that a restricted annular space is left, as clearly shown in Fig. 1b. The diameter of such opening 17 is furthermore large enough so that such opening will slightly overlap the openings 18 in the head 12 (see Fig. 1a) that give the latter the spider formation previously referred to.

The inward extension 11 of tubular piston 5 is formed with lateral openings 20 through which communication is freely had between the interior of the said piston and the interior of shell 4 in the normal extended position of the former. However, when the piston is forced inwardly, plunger 10, which remains stationary, directly closes such openings 20, as will be readily understood. The outer end of piston 5 is somewhat reduced in diameter and externally threaded to receive a nozzle 21. The discharge opening 22 of the latter is externally of flaring or more or less conical form, as best shown in Figs. 2 to 5, inclusive; while a check valve 23 is held normally seated by means of a compression spring 24 against a suitable seat in the end of the tubular piston so as to permit of the discharge of lubricant through the bore of the latter into such nozzle and its emission through the opening 22, but prevent any return flow of lubricant or air.

In operation, the container, suitably held in the user's hand, is moved to bring the nozzle 21 into sealing contact with the nipple, presently to be described, and pressure is thereupon exerted on such container longitudinally of its axis or of the axis of the discharge device proper. As a result, the tubular piston 5 is forced inwardly against spring 8, and, assuming the piston to be filled with lubricant, as the result either of priming or of a previous operation, a predetermined amount of lubricant will be forcibly discharged through the nozzle and into the nipple, the amount depending upon the capacity of the tubular piston and the length of its stroke. In this operation, as already described, the forward end of plunger 10, after passing beyond the lateral openings 20 in the piston, effectually seals the inner end of such piston and these are not again opened until the piston, under the force of spring 8, is again allowed to resume its extended position. In thus resuming its extended position, due to the seating of valve 23 and consequent sealing of the outer end of the piston, a fresh charge of lubricant is drawn through such openings into the piston ready to be forcibly emitted the next time the device is operated.

During the filling operation last described, the lubricant is freely drawn from the body of the container into the interior of shell 4 through hollow member 14, openings 18 in the head 12 of plunger 10, and the annular space 17 left between the cup piston 15 and said plunger 10. However, during the operation of discharging lubricant from the tubular piston 5, sufficient back pressure is created in the shell 4 to force said cup piston 15 inwardly until its head presses against head 12 of plunger 10. The back flow of lubricant from within the shell 4 is thus greatly restricted, although not quite shut off, due to the fact that the annular space 17 slightly overlaps the openings 18 in such head 12. A sufficient pressure is thus developed in the shell 4 to insure the complete filling of the tubular piston 5 prior to the closing off of the lateral openings 20 therein by the forward end of piston 10 and the lubricant in the latter is in effect subjected to a double compression, as a result of which such lubricant is emitted with correspondingly increased force through nozzle 21 into the nipple.

The form of nipple shown in Figs. 2 to 5, inclusive, comprises a tubular body 25 that is externally threaded at one end for attachment to the journal or other bearing part to which lubricant is to be supplied. A portion 26 of such body is made of polygonal cross-section so as to facilitate the engagement therewith of a wrench or other tool and the bore in said body is enlarged to form a recess 27 adjacent the corresponding end. A separate teat member 28, having an enlarged or flaring end 28a, is seated in such recess and the surrounding metal of the body 25 is forced inwardly over such enlarged end or base, whereby such teat member is firmly attached to said body. The eyeleting operation, whereby member 28 is thus firmly secured to the body of the nipple, may be accomplished by spinning, pressing, or otherwise, as found best suited for the purpose. Such body may be made of relatively soft metal so that it can be fashioned from rod or bar stock on an automatic machine, but the teat member will preferably be stamped up from a strip or sheet of relatively hard metal or of metal capable of being subsequently hardened so that the exterior surface of said member will not be affected by any ordinary chance blow, nor will it be subject to abrasion or wear under ordinary use.

The outer or contact face of member 28 is dome-shaped, being convexly curved symmetrically about its axis so as to be adapted to fit tightly against the flaring mouth of opening 22, whether the latter be of the strictly conical form shown in Fig. 2, or of the convexo-conoidal form shown in Fig. 4, or of the concavo-conoidal form shown in Fig. 5, this irrespective of whether the axes of the nozzle and nipple coincide, as shown in Figs. 1 and 2, or are angularly related, as shown in Figs. 3, 4 and 5. The opening 28$^b$ in the end of member 28 will, it should be noted, in all such positions, communicate freely with the opening 22 in the nozzle. It will be observed that in the case of the contacting face of the nozzle opening, just as in the case of the teat member 28, the curvature is symmetrical about the axis. The surface, in other words, in the case of the conical contact face of Figs. 1, 2 and 3, may be regarded as described by the revolution of a straight line about such axis, the line inclining to the latter; while in the form of nozzle opening shown in Fig. 4, such face may be regarded as described by a curved line, specifically an arc of a circle, similarly rotated about the axis of the nozzle. The surface thus generated is accordingly a toric surface in effect and the same term may be applied to the surface in the form of nozzle opening shown in Fig. 5, except that here the curvature is concave instead of convex. The opening has an outer conical portion in the last mentioned form, in addition to the toric surface, but this has nothing to do with the sealing contact between the teat and nozzle.

In the form of nipple shown in the several figures thus far described, a check valve, consisting of a ball 30, is provided, such ball being adapted to seat within the flaring end 28$^a$ of teat member 28 and being normally held in such seated position by means of a spring 31 that is retained within the bore of body 25 by an integral flange or shoulder 32 at the inner end of such bore.

However, such a check valve need not necessarily be employed in the nipple nor does the latter require to be made of two parts, as hereinbefore described. Thus, in Figs. 6, 7 and 8, I show a one piece nipple consisting of a threaded body 35 and a teat 36 integral therewith. The sides of the body may be flattened, as shown, to facilitate engagement with a wrench and the opening 37 in the teat communicates directly with the bore in the body. This form of nipple is obviously of cheaper construction than the one shown in the preceding figures, but in many situations, particularly in the case of industrial machinery, will serve every purpose just as well. The same conformation of the contact face of the teat 36, as heretofore described, will of course be retained in this simpler form of nipple; in other words, such contact face is convexly curved symmetrically about its axis so as to be adapted to fit tightly in a flaring nozzle opening of the type shown in Figs. 2, 4 and 5.

The flaring mouth of the nozzle opening, whether of the specific form shown in Fig. 2, Fig. 4, or Fig. 5, will of course be of circular cross-section in a plane normal to the axis of such opening; while planes angularly disposed with respect to such axis will form a corresponding conic section. The curvature of the contact face of teat 28 (or 36) on the nipple will be such as similarly to form a circle or conic section where intersected by a corresponding plane.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. Lubricating apparatus comprising a nipple element and a nozzle element, said nipple element terminating in a spherical end, the other element fitting outside said end and having a flaring mouth defined by rotating a curved line about the axis of said nozzle, the angle between the line and the axis, which measures the flare of the mouth increasing to a maximum at the end of the nozzle.

2. Lubricating apparatus comprising a nipple element and a nozzle element, the nipple element terminating in a spherical end, the other element fitting outside said end and having a flaring mouth defined by rotating a curved line about the axis of said nozzle, all portions of said line sloping outwardly away from said axis.

3. Lubricating apparatus comprising a nipple element and a nozzle element adapted to cooperate in forming a contact seal, said nipple element having an unobstructed inlet of minimum diameter, said inlet being surrounded by a substantially spherical contact surface of minimum radius for providing sufficient strength, said nozzle element fitting outside said spherical contact surface and having a flaring mouth adapted to form a substantially line contact with said spherical surface.

4. Lubricating apparatus comprising a nipple element and a nozzle element adapted to cooperate in forming a contact seal, said nipple element having an unobstructed inlet of minimum cross-section, said inlet being surrounded by a spherical contact surface of minimum radius to provide the necessary strength, said nozzle element fitting outside said contact surface and having a flaring mouth permitting a contact seal to be effected when said elements have various angular relationships.

5. Lubricating apparatus comprising a nipple element and a nozzle element adapted to cooperate in forming a contact seal, said nipple element having an unobstructed inlet of minimum diameter, said inlet being surrounded by a substantially spherical contact surface of minimum radius for providing sufficient strength, said nozzle element fitting outside said spherical contact surface and having a flaring mouth defined by rotating a curved line about the axis of said nozzle, all portions of said line sloping outwardly away from said axis.

In testimony whereof I have hereunto signed my name this 1st day of April, 1924.

OSCAR U. ZERK.